United States Patent Office 3,267,054
Patented August 16, 1966

3,267,054
AQUEOUS PAPER PULP MIX CONTAINING POLYMERIC POLYESTER WITH CARBOXYL GROUPS AND A POLYALKYLENIMINE
Joseph F. Abere, White Bear, Minn., assignor to Minnesota Mining and Manufacturing Company, St. Paul, Minn., a corporation of Delaware
No Drawing. Filed Nov. 18, 1960, Ser. No. 70,115
1 Claim. (Cl. 260—17.4)

This invention relates to an aqueous emulsion of a resinous composition. In one aspect, the invention relates to a process for curing or cross-linking polymers in aqueous emulsion. In another aspect, this invention relates to aqueous emulsions of low molecular weight prepolymers having on the average more than one active site and of a cross-linking agent.

As the result of the excellent chemical and physical properties of low molecular weight prepolymers, these prepolymers have been proposed for use as coatings and impregnants on various surfaces. The flexibility and protective and weathering properties of prepolymers in their cured form have made then particularly attractive for use as coatings on fabrics. Heretofore, it has been suggested to apply low molecular weight prepolymers to surfaces in liquefied form or in organic solution. The liquid prepolymers have the disadvantage of being rather viscous having poor penetration properties and being incompatible with the surface; thus difficult to apply as thin coatings. Solutions of prepolymers are disadvantageous because of cost and the dangers resulting from the toxicity and flammability of the organic solvents. It is much to be desired to provide a suitable handling medium and process for curing prepolymers which can be used in connection with the treating of surfaces without the above disadvantages.

The object of this invention is to provide a new aqueous emulsion of low molecular weight prepolymers.

Another object of this invention is to provide a new fabric coating composition and fabrics coated therewith.

Still another object of this invention is to provide a method for coating leather with a composition useful, for example, as scuff-resistant compositions on shoes.

Still another object of this invention is to provide stable aqueous emulsions containing curable low molecular weight prepolymers and the curing agent, useful for protective coating of surface, as an adhesive, as a plasticizer for other plastic compositions, etc.

Yet another object of this invention is to provide a process for producing an emulsion of a cured or cross-linked prepolymer.

Another object of this invention is to provide a process for cross-linking or curing of low molecular weight polymers.

Various other objects and advantages will become apparent to those skilled in the art from the accompanying description and disclosure.

In accordance with the invention, it has been found that low molecular weight prepolymers containing on the average more than one carboxyl group per molecule can be dispersed and cured or cross-linked in an aqueous medium in the form of an emulsion utilizing a suitable emulsifying agent. Such aqueous emulsions have a high degree of stability while not affecting the desirable mechanical and chemical properties of the prepolymer contained therein.

The emulsions of this invention are prepared by mixing the prepolymers and emulsifying agent with water while vigorously agitating the mixture. Agitation may be effected by shaking, by a paddle agitator or by a propeller. The agitation is sufficient to break up the prepolymer into a particle size in the water of between about 5 and about 20 microns. The prepolymer is dispersible in the water up to about 50 weight percent based on the aqueous suspending medium. After the prepolymer has been dispersed or emulsified in the aqueous medium, a polyfunctional ethylenimine is added as the curing agent. Curing may be started immediately on mixing, or retarded until the emulsion is applied to the surface, such as by cooling below 10° C. When the emulsions are coated on fabrics, paper and leather for such uses as in lightweight tarpaulins, radomes, electrical insulation, collapsible storage and and shipping containers, protective clothing and shoes, upholstery, etc., they result in tough, flexible coatings which are superior in many respects to the presently used coatings.

The preferred prepolymer in accordance with this invention is a low molecular weight carboxyl-containing polyester obtained by the copolymerization of a diol, a dibasic acid and a polyfunctional compound containing at least three functional groups. The polyester is prepared by reacting together the above components at a temperature of about 100 to about 220° C. at atmospheric or elevated pressure until the reaction is substantially complete as evidenced by the production of approximately the theoretical amount of water of esterification of the reaction. The temperature of reaction should be maintained below that temperature where the particular polyester product will decompose. The reaction may be carried out in the presence of an inert organic solvent to increase mobility of the product mixture and thereby insure completion of the reaction. Suitable organic solvents include the aromatic hydrocarbons, such as benzene, cyclic ethers, such as dioxane and tetrahydrofuran, and the ketones, such as methyl isobutyl ketone. In one embodiment of the invention, the diol and diacid may be prereacted together and the resulting product then reacted further with the polyfunctional component.

The amount or proportion of the specific monomers of the initial reaction mixture controls the number of carboxyl groups appended to the polyester chain. The major proportion of the functional groups in the reaction mixture provided by the monomers are other than the polyfunctional compound. In addition, more than half of the total functional groups of the monomers in the reaction mixture must be provided by the carboxyl-containing monomer or monomers. In order to provide the most preferred branched polyesters (containing a plurality of carboxyl cross-linking sites) suitable to produce elastomers, between about 1 and about 10 percent of the functional groups of the reaction mixture are provided by the polyfunctional component containing at least three functional groups. The polyfunctional component contains from three to six functional groups per molecule, preferably three to four functional groups per molecule. A portion of the dibasic acid or diol may be replaced with a hydroxy acid or amino acid, thus providing a fourth component of the prepolymer mixture. The polyester polymer of the present invention should contain free carboxyl groups attached to the chain since hydroxyl groups do not generally posses the activity necessary for moderate low temperature vulcanization or cross-linking.

Mixtures of the various reactive components may be used without departing from the scope of this invention. For example, two or more diols may be used as the diol component. Also, two or more dibasic acids or two or more trifunctional components may be used.

In one embodiment, the polyester may be prepared by substituting a hydroxy acid for both the diol and diacid; in which case the reaction mixture is composed of a hydroxy acid and the polyfunctional compound having at least three carboxyl groups.

The diol component of the polyester prepolymer is an aliphatic diol in which the carbon chain may or may not be interrupted with oxygen, sulfur, nitrogen, or an aromatic group, such as a phenyl group. Typical examples of suitable diols include neopentyl glycol (2,2-dimethyl-1,3-propanediol), diethylene glycol, polyethylene glycols (200 to 4,000 molecular weight), 2,2-bis[4-(2-hydroxypropoxy)phenyl]-propane, 1,2-propylene glycol, 3 - methyl - 3 - azapentandiol - 1,5, di - 1,4 - (2 - hydroxypropoxy)-benzene, 1,4-butylene glycol, 2,2-diethyl-1,3-propanediol, polypropylene glycols (200 to 4,000 molecular weight), polybutylene glycols (200 to 4,000 molecular weight), 1,1,5,5-tetrahydroperfluoropentane diol, and tetrahydroperfluoroether glycol.

The dibasic acid component of the polyester prepolymer includes both aliphatic and aromatic dibasic acids in which the hydrocarbon chain of the aliphatic acid may or may not be interrupted with oxygen or sulfur. Suitable examples of dibasic acids include succinic acid, adipic acid, glutaric acid, diglycolic acid, thiodipropionic acid, oxydipropionic acid, azelaic acid, sebacic acid, fumaric acid and maleic acid.

The polyfunctional compound providing the cross-linking sites and having at least three functional groups include polyanhydrides, polyols and polybasic acids. The polyols are aliphatic but may include an aromatic group, such as a phenyl group, interrupting the hydrocarbon chain. The polybasic acids and polyanhydrides include both aliphatic and aromatic compounds. Suitable examples of such polyfunctional compounds containing at least three polyfunctional groups include glycerol, trimethylolpropane, trimethylolmethane, mannitol, pentaerythritol, trimesic acid, tricarballylic acid, benzene tetracarboxylic acid, pyromellitic dianhydride, 1,4,5,8-naphthalene tetracarboxylic dianhydride and cyclohexanetetracarboxylic anhydride.

Suitable hydroxy acids (including lactones) and amino acids which may be used in accordance with this invention include citric acid, 12-hydroxy stearic acid, N-methyl-β-alanine, hydracrylic acid, N-methyl-omega-aminoundecanoic acid, N-methyl-6-aminocaproic acid, and caprolactone.

Typical examples of branched polyesters include the following combinations: glycerol, neopentyl glycol (2,2-dimethyl-1,3-propanediol) and succinic acid; trimethylolpropane, diethylene glycol, and adipic acid; trimethylolpropane, neopentyl glycol and diglycolic acid; glycerol, diethylene glycol, and adipic acid; trimethylolpropane, polyethylene glycol (200 to 4,000 molecular weight) and thiodipropionic acid; trimethylolethane, diethylene glycol, polyethylene glycol (200 to 4,000 molecular weight) and oxydipropionic acid; trimethylolpropane, 2,2-bis[4-(2-hydroxypropoxy)phenyl]-propane and azelaic acid; mannitol, diethylene glycol and diglycolic acid; pentaerythritol, propylene glycol, sebacic acid, and isophthalic acid; and trimethylolpropane, 3-methyl-3-azapentandiol-1,5 and azelaic acid; trimesic acid, diethylene glycol and adipic acid; citric acid, polyethylene glycol (200 to 4,000 molecular weight) and adipic acid; citric acid, di-1,4-(2-hydroxypropoxy)benzene, fumaric acid and sebacic acid; benzene tetracarboxylic acid, propylene glycol, 1,4-butylene glycol and adipic acid; benzene tetracarboxylic acid, polyethylene glycol (200 to 4,000 molecular weight), and maleic acid; benzene tetracarboxylic acid, 2,2-diethyl-1,3-propanediol, and diglycolic acid, 1,1,5,5-tetrahydroperfluoropentanediol, adipic acid, trimethylolpropane; tetrahydroperfluoroether glycol (HOCH$_2$CF$_2$CF$_2$OCF$_2$CF$_2$CH$_2$OH)

adipic acid, trimethylolpropane; benzene tetracarboxylic acid, 12-hydroxy stearic acid; polyacrylic acid, hydracrylic acid; pyromellitic dianhydride, polybutylene glycol (200 to 4,000 molecular weight); 1,4,5,8-naphthalene tetracarboxylic dianhydride, polypropylene glycol (200 to 4,000 molecular weight); and diethylene glycol, adipic acid and pyromellitic dianhydride.

Low molecular weight polymerized fatty acids which are also suitable for use in the present invention as the carboxyl-containing prepolymer can be characterized as polymeric fat acids of the drying and semi-drying oils. They are derived from unsaturated monomers having at least two double bonds and containing acyl groups; and can therefore be designated as polymerized polyene fatty acids. The preparation of such polymeric polyene fatty acids is described in U.S. Patents 2,482,761, 2,373,015 and 2,435,478.

The polymerized polyene fatty acids which result from the preparatory processes described in the above patents can be characterized by their average molecular weights. Thus, the dimeric, dibasic fatty acid polymers prepared from C-18 acids have been described as having an average molecular weight of about 560 while the corresponding trimeric tribasic acids have an average molecular weight of about 840. Mixtures of the dimeric and trimeric acids will have molecular weights which are intermediate these numbers, while the tetramers and mixtures containing them will have correspondingly higher molecular weights. Illustrations of the polymeric fatty acids which can be employed herein are, for example, the dibasic dimerized linoleic acid of approximately 600 molecular weight which is sold by Emery Industries, Inc. of Cincinnati, Ohio, under the trade name "Emery Dimer Acid 3079–S"; and "Emery Trimer Acid 3055–S" which is a tribasic acid trimer of linoleic acid of average molecular weight of approximately 845.

Other fatty acid polymers which are suitable for use in the present invention are the mixtures of polymerized fatty acids derived from soybean oil, peanut oil, linseed oil, dehydrated castor oil, corn oil, tung oil, cottonseed oil, sardine oil, tall oil and other oils of the drying or semidrying type.

Acrylic addition copolymers prepared from an γ-β unsaturated monocarboxylic acid and a diene, such as a copolymer of acrylic acid and butadiene, or methacrylic acid and isoprene, are also suitable carboxyl-containing prepolymers for use in this invention.

Another group of carboxyl-containing prepolymers useful in accordance with this invention include carboxyl-terminated low molecular weight polymers of monoolefins and diolefins. For example, butadiene is anionically polymerized in the presence of a sodium salt and then the polymer is reacted with carbon dioxide and acidified to produce carboxyl termination on the polymer chain. Such a carboxyl-terminated polybutadiene has an acid number of 17 and an average molecular weight of about 7000.

The suitable curing agents which are employed in accordance with this invention are the polyalkylenimines of the formula

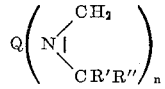

where Q is an $n$ valent radical, $n$ is 2 or more (preferably 2 or 3), N is linked to an atom having a valence of 4 or 5, and R' and R'' are hydrogen or an alkyl group preferably having from 1 to 4 carbon atoms. Q may be an aliphatic, aromatic or alicyclic organic radical which does not contain an active hydrogen but which may contain atoms other than carbon, such as oxygen, sulfur, phosphorous, nitrogen, etc. Q may also be an inorganic radical, such as

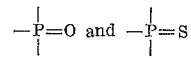

Such phosphorus containing alkylenimine derivatives include, for example, tris(1-aziridinyl) phosphine oxide, tris(1-aziridinyl) phosphine sulfide, N,N-diethyl-N',N''-diethylenethiophosphoramide, N,N' - diethylenbenzene thiophosphondiamide, N-(3-oxapentamethylene)-N',N''-diethylene phosphoric triamide, N,N'-diethylenbenzene phosphondiamide, N,N'-diethylene ethane phosphondiamide, butyl N,N'-diethylenediamidophosphate, N,N-dioctyl-N',N''-diethylenephosphoric triamide, N,N',N''-tris-(1,1-dimethylethylene)phosphoric triamide, etc.

The preferred curing agents employed are substituted polyalkylene amides represented by the following illustrative formulae:

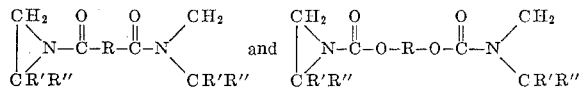

wherein R represents an organic radical, such as an alkylene radical having from 4 to 40 carbon atoms, a 1,3-phenylene radical or a 1,4-phenylene radical, and R' and R'' each represent hydrogen or an alkyl radical having from 1 to 8 carbon atoms.

The above curing agents included within the scope of the above formulae are characterized by properties which permit storage without spontaneous polymerization since they can be produced in substantially pure form, i.e. a product having an azirane ring content of at least 85 percent, usually at least 95 percent, of theoretical. They are controllably reactive and are especially useful for purposes of chain extension of carboxyl group-containing prepolymers as disclosed herein.

Among the N,N'-bis-1,2-alkylenamides useful as curing agents are

N,N'-bis-1,2-ethylenadipamide,
N,N'-bis-1,2-ethylenipimelamide,
N,N'-bis-1,2-ethylenisosebacamide;
N,N'-bis-1,2-butylenisosebacamide;
N,N'-bis-1,2-ethylensebacamide;
N,N'-bis-1,2-ethylensuberamide;
N,N'-bis-1,2-propylensuberamide;
N,N'-bis-1,2-butylensuberamide;
N,N'-bis-1,2-ethylenazelaamide;
N,N'-bis-1,2-propylenazelaamide;
N,N'-bis-1,2-butylenazelaamide;
N,N'-bis-1,2-ethylendodecanoyldicarboxylic acid amide;
N,N'-bis-1,2-ethylentetradecanoyldicarboxylic acid amide;
N,N'-bis-1,2-propylentetradecanoyldicarboxylic acid amide;
N,N'-bis-1,2-ethylenhexadecanoyldicarboxylic acid amide;
N,N'-bis-1,2-ethylenoctadecanoyldicarboxylic acid amide;
N,N'-bis-1,2-propylenoctadecanoyldicarboxylic acid amide;
N,N'-bis-1,2-propylendodecanoyldicarboxylic acid amide; and
N,N'-bis-1,2-pentylensebacamide;
N,N'-bis-1,2-ethylenisophthalamide;
N,N'-bis-1,2-butylenisophthalamide;
N,N'-bis-1,2-propylenisophthalamide;
N,N'-bis-1,2-pentylenisophthalamide;
N,N'-bis-1,2-ethylenterephthalamide;
N,N'-bis-1,2-propylenterephthalamide;
N,N'-bis-1,2-butylenterephthalamide;

etc. Mixtures of these monomers may be produced by employing mixed 1,2-alkylenimines.

The N,N'-bis-1,2-alkylenamide curing agents are prepared in monomeric form by the following process: a 1,2-alkylenimine, desirably containing not more than 6 carbon atoms, such as ethylenimine, 1,2-propylenimine, 1,2-butylenimine, 1,2-pentylenimine, etc., is reacted with an aliphatic dicarboxylic acid chloride containing 6 to 42 carbon atoms, (e.g., isosebacoyl dichloride, sebacoyl dichloride, suberoyl dichloride, azelaoyl dichloride, tetradecanoyl dichloride, dodecanoyl dichloride, hexadecanoyl dichloride and octadecanoyl dichloride), isophthaloyl chloride or terephthaloyl dichloride; to produce the desired substantially pure N,N'-bis-1,2-alkylenamide monomer, with hydrogen chloride as a by-product. The 1,2-alkylenimine is employed in a ratio of about 2 moles for each mol of acid chloride. Advantageously, an excess of 1,2-alkylenimine, such as about 5 percent by weight, over and above this ratio may be employed, although an excess of up to about 25 percent may be employed.

Desirably, the 1,2-alkylenimine is introduced in an aqueous solution which also contains an alkali metal carbonate, such as sodium, potassium, or lithium carbonate, which acts as an acid-acceptor to neutralize the hydrogen chloride formed during the reaction of the process. When a higher 1,2-alkylenimine than 1,2-ethylenimine, i.e., one containing more than 2 carbon atoms, is employed, an alkali-metal bicarbonate, such as sodium, potassium, or lithium bicarbonate, may be used as the acid-acceptor instead of a carbonate. This aqueous solution is intimately mixed with the carboxylic acid chloride dissolved in a substantially water-immiscible organic solvent which is chemically inert to both the reactants and the reaction products and in which the resulting N,N'-bis-1,2-alkylenamide is soluble. The N,N'-bis-1,2-alkylenamide monomer reaction product is then recovered in a relatively pure, stable state in high yield from the organic solvent, in which it collects as the reaction proceeds, by evaporating the solvent. By this process of producing the monomers any possibility of attack on and decomposition of the alkylenamide product by hydrogen chloride formed during the course of the reaction is effectively minimized.

In producing N,N'-bis-1,2-alkylenamides of 1,2-ethylenimine accordingly, pH control of the reaction mixture is more critical than where alkylenimines containing more than 2 carbon atoms are employed. Thus, in such cases it is important to employ an alkali-metal carbonate as the acid-acceptor in an amount sufficient to neutralize all of the hydrochloric acid formed during the reaction of the process and yet maintain the pH of the reaction mixture of about 8.5 or above. With 1,2-alkylenimines containing more than 2 carbon atoms, on the other hand, an alkali-metal bicarbonate may be employed instead of an alkali-metal carbonate as the acid-acceptor, so long as sufficient bicarbonate is present to neutralize all of the hydrochloric acid formed. This phenomenon is believed to be the consequence of the greater reactivity of ethylenimine when compared to those alkylenimines containing more than 2 carbon atoms. The preventio nof decomposition of the bis-alkylenamide monomer by the hydrogen chloride formed during the process which this process provides is critical to the production of stable monomer product in useful amounts.

Illustrative of the bis-carbamates which are useful as curing agents in the present invention are:

N,N'-bis-1,2-ethylene (1,4-butanediol) carbamate;
N,N'-bis-1,2-propylene (1,4-butanediol) carbamate;
N,N'-bis-1,2-butylene (1,4-butanediol) carbamate;
N,N'-bis-1,2-ethylene (diethylene glycol) carbamate;
N,N'-bis-1,2-butylene (diethylene glycol) carbamate;
N,N'-bis-1,2-ethylene (triethylene glycol) carbamate;
N,N'-bis-1,2-propylene (triethylene glycol) carbamate;
N,N'-bis-1,2-butylene (triethylene glycol) carbamate;
N,N'-bis-1,2-ethylene (polyethylene glycol-200) carbamate;
N,N'-bis-1,2-ethylene (polyethylene glycol-400) carbamate;
N,N'-bis-1,2-ethylene (polyethylene glycol-1000) carbamate;
N,N'-bis-1,2-propylene (polyethylene glycol-1000) carbamate;
N,N'-bis-1,2-ethylene (polyethylene glycol-4000) carbamate;
N,N'-bis-1,2-ethylene (polypropylene glycol-1025) carbamate;
N,N'-bis-1,2-ethylene (polybutylene glycol-500) carbamate;
N,N'-bis-1,2-ethylene [1,1'-isopropylidene-bis-(p-cyclohexanol)] carbamate;
N,N'-bis-1,2-ethylene [1,1'-isopropylidene-bis-(p-phenylenoxy)di-2-propanol] carbamate;
N,N'-bis-1,2-ethylene phenylenoxydiocetamide;

N,N'-bis-1,2-ethylene phenylenoxy carbamate;
N,N'-bis-1,2-ethylene-4,4'-bisphenyl carbamate;
N,N'-bis-1,2-ethylene (1,1'-isopropylidene-bis-phenylene) carbamate;
N,N'-bis-ethylene-resorcinol carbamate, etc.

The preferred aromatic carbamates are represented by the above formula wherein R is 1,3-phenylene, 1,4-phenylene, 1,1'-isopropylidene-bis-phenylene, or 1,1'-isopropylidene-bis-(p-phenylenoxy) di-2-propanol. The preferred aliphatic carbamates are represented by the above formula wherein R is a branched or straight chain alkylene radical having from about 4 to about 40, preferably from about 4 to about 20, carbon atoms.

Generally, their preparation involves the reaction of a 1,2-alkylenimine in a water phase with a solution of a chlorocarbonate of a difunctional alcohol in a water immiscible organic solvent, in the presence of an acid acceptor, at a temperature between about −5° C. and 30° C.

In the preparation of the compositions of the invention, the polycarboxyl group-containing prepolymers are employed in dispersed or emulsified form in an aqueous medium. To the emulsified polycarboxyl prepolymer is added the polyalkylenimine curing agent which is to be employed. While an amount of the curing agent which is equivalent stoichiometrically to the number of carboxyl groups present may be employed, and some desirable curing effects can be obtained with even smaller amounts, full cures are effected when amounts greater than stoichiometric amounts are employed, ranging upwards from 10 to 100 percent greater; and it is ordinarily preferred that about 20 to 40 percent excesses of the theoretical stoichiometric equivalent of the curing agent be used in order to compensate for any inerts in the curing agent, its adsorption on and reactivity with fillers, etc. Curing is effected at a temperature between about room temperature (22° C.) and about 150° C. In some instances, the cure is initiated as soon as the two components are mixed in the emulsion; therefore, the emulsion may have to be applied to the surface to be coated soon after adding the curing agent. The rate of cure is dependent upon the particular curing agent employed, the prepolymer, the temperature, the viscosity of the mixture and the amount of the curing agent. By maintaining the dispersion at low temperatures, for example, about 0–15° C., the curing is retarded and increased pot life is obtained. Curing may also be retarded by the use of a basic emulsion, or the use of a curing agent which requires elevated temperatures to start the curing or cross-linking reaction. The curing agent may be soluble or insoluble in the aqueous medium.

If desired, fillers can be added to the dispersion as well as dyes or other substances which may be considered as adjuvants and the like, for example, accelerators, antioxidants, and catalysts. The finer fillers are good reinforcing agents for these systems, neutral fillers such as calcium carbonate, iron oxide and titanium dioxide being preferred. Acidic fillers such as certain carbon blacks and silicas can also be used if proper adjustments are made for pH (e.g. addition of increased amounts of curing agent).

The prepolymer and curing agent composition of this invention can be conveniently handled and applied to surfaces from these aqueous emulsions. It has been found that the water-insoluble prepolymers may be suspended in aqueous medium in an amount between about 5 and about 50 weight percent based on water. The cross-linking agents, such as the polyalkylenamides hereinbefore described, may be included in the dispersion together with fillers, pigments, and dispersing and emulsifying agents which are present in an amount of about 0.1 to 20 weight percent based on water.

Among the emulsifying agents that are useful for dispersing the prepolymers in the aqueous vehicle, the following are examples:

Morpholine salts of fatty acids of 12–18 carbon atoms such as morpholine oleate and stearate; acetates of n-primary amines having 12–18 carbon atoms in amine chain such as n-dodecyl amine acetate, n-octadecyl amine acetate, n-octadecenyl amine acetate and n-octadecadienyl amine acetate; monoesters of polyethylene glycols and fatty acids of 12–18 carbon atoms such as hexaethylene glycol monooleate; alkylated aryl polyether alcohols; alkali metal soaps of fatty acids of 12–18 carbon atoms; soaps of alkalis such as alkanolamines, borax, morpholine, ammonia, alkali metals, and the like with acids such as oleic acid, red oil, mixed amino fatty acids, and the like; di-n-octyl sodium sulfosuccinate; oleic acid condensate of polyethylene oxide; sodium salt of a secondary alkyl sulfate; aryl alkyl polyether alcohols; and aryl polyether alcohols.

Suitable emulsifying agents include potassium oleate, sodium stearate, sodium lauryl sulfate, sodium salt of long chain alkyl sulfonates derived from kerosene, ammonium salt of perfluorooctanoic acid, lithium salt of perfluorooctane sulfonic acid, potassium salt of N-ethyl-N-perfluorooctanesulfonyl glycerine, and ethylene oxide derivatives of alkylated phenols.

These dispersing or emulsifying agents are usually included in an amount between about 0.1 and about 15 weight percent based upon the water content of the dispersion. The dispersion is prepared by adding the emulsifying agent to water and then adding the prepolymer to the water solution. The curing agent is usually added to the emulsion just prior to use, but this is not always necessary. In some instances, an organic solvent, such as toluene, is used as a means for dissolving the curing agent or the prepolymer and aiding in the dispersion of these components in the aqueous medium. Dispersions made in accordance with the above may be utilized for protectively coating surfaces or for making up compositions which include other materials, such as plasticizers for vinyl polymer, in paper making, or for the saturation and treatment of fabrics and paper, or as an adhesive or primer to be used as an intermediate layer.

As previously stated, the aqueous emulsion of this invention can be applied to various surfaces, such as synthetic fabrics, paper, and metal, but one of the most unique and best applications of the aqueous emulsion is to leather surfaces either as an impregnant or as a coating. Leather which may be treated with the aqueous emulsion of this invention containing a curing agent and then cured includes rawhide, cowhide, pigskin, doeskin, kid and alligator hide. Such finished or coated leather may be used for shoes, shoe soles, pocketbooks, belts, industrial gaskets and seals, harnesses, saddles, briefcases, luggage, table tops, chairs, gloves, coats and jackets. The leathers coated with the dispersion of the prepolymer and cured are tough and scuff-resistant. Such leathers are also waterproof. The flex properties and general appearance of the leather are not affected by the cured prepolymer coating. The prepolymer emulsion may be utilized as a base coat, a primer coat or adhesive coat, or as a top coat for leather when cured in situ. When used as a top coat, the dry tanned leather is mechanically worked to render it supple. Next, the pigment coats are applied usually from water dispersions in a natural or synthetic resin. The pigment is usually included in the resin and then dispersed in the aqueous medium. Natural resins include shellac or albumin but may be replaced with synthetic acrylic or urethane resins. The top coat is then applied also from a water dispersion. This top coat in accordance with this invention is an aqueous emulsion of the prepolymer and curing agent with or without dyes, pigments or fillers, such as silica, titanium dioxide, talc, carbon black, aniline dyes and powdered metals, such as copper or silver. The coats may be applied by spraying, swabbing or brushing.

The present emulsion is particularly useful as an adhesive coating for applying highly fluorinated polymer films to surfaces, such as metal, glass and plastic surfaces. Examples of fluorinated polymers are elastomeric copolymers of vinylidene fluoride and trifluorochloroethylene or perfluoropropene.

The following typical examples relate to the preparation of the starting materials and the emulsion as well as the use of the resulting emulsions. The proportions shown in parts are parts by weight.

Example I

This example is a bulk preparation of a saturated polyester of adipic acid, diethylene glycol and trimethylolpropane. About 584 grams (4.0 mols) of adipic acid, 388 grams (3.7 mols) of diethylene glycol, 12.44 grams (0.09 mol) of trimethylolpropane and 2 grams of a triphenyl phosphite catalyst were charged to a stirred flask. The reaction mixture contained 5 percent excess of carboxyl groups over hydroxyl groups and 1.8 percent of these functional groups were provided by the trimethylolpropane. The reaction was carried out at 160–180° C. in a nitrogen atmosphere. When approximately the theoretical amount of water of esterification was driven off (indicating that the reaction is essentially complete) the pressure was reduced gradually and the temperature was increased to 220° C. The reaction was terminated when the acid number of the melt reached 27.9. The characteristics of the polyester are as follows:

| | |
|---|---|
| Inherent viscosity in acetone | 0.13 |
| Number average degree of polymerization ($X_n$) | 50 |
| Molecular weight ($M_n$) (average) | 5000 |
| Free carboxyl groups per molecule (average) | 2.6 |
| Acid concentration (milliequivalents per gram) | 0.50 |

Example II

A water emulsion of a carboxylic acid-terminated polyester (adipic acid diethylene glycol polyester of Example I) was prepared. To this emulsion could be added a curing agent and dispersed along with the polyester emulsion. Such dispersions find wide utility in many areas, such as coatings for wood and metal, treatments for cloth, paper, as beater additives and in addition almost any other application where presently used polymeric emulsions and dispersions and lattices are employed. In this example, the emulsion formulation is shown below:

| | Parts |
|---|---|
| Water | 100 |
| Polyester | 20 |
| Toluene | 20 |
| Soap (sodium lauryl sulfate) | 20 |
| N,N'-bis-1,2-ethylenisosebacamide | 4 to 8 |

This formulation was used by addition to paper pulp with a beater. The transparency of the resulting paper sheet was very good and the tensile strength was increased while the tear strength remained the same on the sheet. In addition to the development of improved paper properties, the resulting sheet was transparentized.

Example III

A dispersion prepared from the same formula as employed in paper making of Example II was also found useful in the making of rubber goods from latex, by electrodeposition. This technique may be employed to manufacture such articles as rubber gloves by plating out the elastomer on a ceramic glove form coated with a conductive layer. In this experiment a 6-volt D.C. supply was connected to a 12 ohm rheostat switch, and two copper electrodes in series. As the current flowed from one electrode to another through the emulsion, the dispersed particles of polyester elastomer plated out and discharged on the anode. It was found that as electrodeposition proceeded current blocking occurred (as film thickness increased on the anode) while the cathode (and rod) remained uncoated. The coated anode was placed in an oven for 20 minutes at 120° C., and cured to a strong elastomer showing that a continuous film of electrodeposited elastomer had been formed from the dispersion.

Example IV

The preparation of scuff-resistant finishes for leather from polyester elastomers can also be achieved from latex or water dispersion. In a typical experiment, a masterbatch was prepared on a paint mill consisting of 100 parts of the polyester of Example I, 15 parts silica, and 2 parts Agerite White antioxidant. This masterbatch was dispersed in a small amount of water containing an emulsifier, such as sodium lauryl sulfate, just enough to allow the coating to be spread freely over the leather surface. The dispersion formulation was 5 parts polyester masterbatch, 1 part bis-ethylenisosebacamide, 1 part toluene, and 20 parts water. Coatings of this formulation were spread by hand with a brush to work it evenly over the leather. The spread coating was cured by infrared lamps. A firm tack-free abrasion-resistant clear coating results. Onto this base coat could be deposited the various conventional finishing coats, if desired.

Example V

The following emulsion formulation was used to make up different emulsions which were then used to coat both full grain leather and black buff leather:

| Standard formulation: | Parts |
|---|---|
| Water | 100 |
| Prepolymer | 10 |
| Curing agent | 1–10 |
| Emulsifier | 1 |
| Acid acceptor | 1 |
| Antioxidant | 0.2 |

Prepolymers used in the above formulation to make the different emulsions were neopentyl glycol sebacate (trimethylolpropane cured) polyester, neopentyl glycol isosebacate trimethylolpropane cured) polyester, Emery Dimer acid, addition copylmer of acrylic acid and butadiene, 3,3'-oxy-bis-tetrafluoropropanol adipate (trimethylolpropane cured) polyester, a copolymer of dimethyldiethoxysilane and beta-carbethoxypropyl methyl diethoxysilane, and diethylene glycol adipate (trimethylolpropane cured) polyester.

Curing agents used in the above formulation to make the different emulsions include N,N'-bis-1,2-ethylenisosebacamide, N,N'-bis-1,2-butylenisosebacamide, N,N'-bis - 1,2-propylenisosebacamide, N,N'-bis - 1,2-ethyleniso-phthalamide, N,N'-1,2-propylenisophthalamide, bis-ethylenecarbamate of bis-phenol A, and tris-aziridinyl phosphine oxide.

Emulsifiers used in the above formulation to make up different emulsions include $NaOSO_2CH_2CH_2N(CH_3)COOC_{10}H_{21}$ (Igepon T–77)
$C_8F_{17}SO_2OK$, $C_8F_{17}SO_2NCH_3(150CH_2CH_2)OH$ sodium stearate, sodium lauryl sulfate, n-alkyl trimethyl ammonium chloride, stearyl dimethyl benzyl ammonium chloride, $C_8F_{17}SO_2NHC_2H_6N(CH_3)_3$, alkyl polyoxyethylene amine, lauric alkylolamine condensate, and $NaOSO_2OCH_2CH_2CH(C_2H_5)$
$CH_2CH_2CH(OH)CH_2CH_2CH(C_2H_5)CH_2OH$ (Tergitol–7).

A suitable acid acceptor is morpholine and a suitable antioxidant is sym. di-beta-naphthyl-para-phenylenediamine (Agerite White).

All of the above components are useful in combination to make up the emulsion formulation. For example, a useful emulsion has been found to comprise in parts by weight in accordance with the basic formulation, water, neopentyl glycol sebacate, N,N'-bis-1,2-ethylenisosebacamide, $C_8F_{17}SO_2OK$, morpholine and di-beta-naphthyl-para-phenylenediamine. If desired, about 2 parts of an aromatic hydrocarbon, such as toluene, may be added to the emulsion as an aid to emulsifying the components thereof. The above emulsions are stable up to three weeks and longer. Strong plastic or elastomeric films in cured form have been cast from such emulsions. These emulsions when applied to leather show good drying characteristics, good oil and water repellency, and materially improve the scuff resistance of the leather finish. The spreading quality of the aqueous dispersions are good and in most instances give a smooth, transparent, glossy appearance.

Plastisols can be made from the emulsions of this invention by including in the emulsion, in addition to the above components, a vinyl plastic or elastomers, such as polymers and copolymers of vinyl chloride, vinyl fluoride, vinyl acetate, styrene, butadiene, trifluorochloroethylene, tetrafluoroethylene. The vinyl plastic or elastomer is included in the emulsion in an amount between about 10 and about 50 weight percent based on water. In such plastisols, the vinyl resin is usually the major constituent compared to other dispersed or dissolved ingredients. Such plastisols when in emulsified form are applied to the surface to be coated and dried. The prepolymer acts as a plasticizer for the vinyl resin and is cured in situ thus minimizing or eliminating bleeding of the plasticizer from the coating or film.

When curing or polymerization is effected in the aqueous phase, the maximum temperature employed is about 100° C.

The carbamates as curing agents are usually soluble in the aqueous phase while the bisamide-type curing agent is usually insoluble. The siloxane prepolymers are particularly useful as coatings or impregnates for leather as they give high gloss to the finish. The trisamide-type curing agents are particularly useful in curing prepolymers having only two carboxyl groups since this results in a space polymer rather than merely a chain-extended polymer. In addition to phosphorus-containing trisamides, as useful in this invention are N,N',N''-tris-ethylenetrimesamide, N,N',N''-tris-2-methylethylenetrimesamide and N,N',N''-tris-2-propylethylenetrimesamide.

Various alterations and modifications of the compositions and their uses may become obvious to those skilled in the art without departing from the scope of this invention.

Having described my invention, I claim:

An aqueous paper pulp mix containing suspended therein as an emulsion between about 5 and about 50 weight percent of a water-insoluble, substantially completely condensed, polymeric polyester of a polyhydric alcohol reactant and an acidic reactant selected from the group consisting of polycarboxylic acid and polycarboxylic anhydrides, at least one of said reactants having at least three functional groups selected from the group consisting of carboxyl group, carboxylic anhydrides group and hydroxyl group, said polymeric polyester having a plurality of carboxyl groups per molecule, and a polyalkylenimine selected from the group consisting of a bis-alkylenamide, a bis-carbamate and a tris-amide.

References Cited by the Examiner

UNITED STATES PATENTS

| | | | |
|---|---|---|---|
| 2,601,597 | 6/1952 | Daniel et al. | 260—9 |
| 2,752,317 | 6/1956 | Sudekum | 260—29.1 |
| 2,800,463 | 7/1957 | Morrison | 260—29.1 |
| 2,843,541 | 7/1958 | Senderoff et al. | 204—181 |
| 2,851,408 | 9/1958 | Cerulli | 204—181 |
| 2,933,416 | 4/1960 | Haakh et al. | 260—29.2 |

WILLIAM H. SHORT, *Primary Examiner.*

JOSEPH R. SPECK, LEON J. BERCOVITZ, *Examiners.*

G. KAPLAN, J. A. SEIDLECK, J. NORRIS,
*Assistant Examiners.*